(12) United States Patent
Kitanosako

(10) Patent No.: US 10,996,734 B2
(45) Date of Patent: May 4, 2021

(54) ELECTRONIC DEVICE THAT RECEIVES POWER FROM POWER SUPPLY APPARATUS AND METHOD THEREOF

(71) Applicant: CANON KABUSHIKI KAISHA, Tokyo (JP)

(72) Inventor: Hiroki Kitanosako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 16/235,253

(22) Filed: Dec. 28, 2018

(65) Prior Publication Data

US 2019/0204896 A1    Jul. 4, 2019

(30) Foreign Application Priority Data

Dec. 28, 2017    (JP) .............................. JP2017-254852

(51) Int. Cl.
*G06F 1/3206*    (2019.01)
*H02J 7/00*    (2006.01)

(52) U.S. Cl.
CPC ............ *G06F 1/3206* (2013.01); *H02J 7/007* (2013.01); *H02J 7/0068* (2013.01); *H02J 7/00* (2013.01); *H02J 2207/40* (2020.01)

(58) Field of Classification Search
CPC . G06F 1/263; G06F 1/28; G06F 1/305; G06F 1/3206; G06F 1/3212;
(Continued)

(56) References Cited

U.S. PATENT DOCUMENTS 5,773,960 A    6/1998 Ueda
2003/0141123 A1    7/2003 Sugiura et al.
(Continued)

FOREIGN PATENT DOCUMENTS

EP    2930588 A1    10/2015
JP    2003-280771 A    10/2003
JP    2012-185661 A    9/2012

OTHER PUBLICATIONS

Universal Serial Bus Type-C Cable and Connector Specification, USB 3.0 Promoter Group, Jul. 14, 2017, Release 1.3, 27 Pages (total).

(Continued)

*Primary Examiner* — Terrell S Johnson
(74) *Attorney, Agent, or Firm* — Cowan, Liebowitz & Latman, P.C.

(57) ABSTRACT

An electronic device includes a connector that includes a first terminal for receiving power from a power supply apparatus, a second terminal, a third terminal, and a fourth terminal; a receiving power control unit that controls power received from the power supply apparatus via the first terminal; a determination unit that determines a power supply capability of the power supply apparatus by using the second terminal or the third terminal and the fourth terminal; and a control unit that restricts, before the power supply capability of the power supply apparatus is determined by using the third terminal and the fourth terminal, power to be received from the power supply apparatus via the first terminal when a predetermined transition occurs in the second terminal.

9 Claims, 6 Drawing Sheets

(58) Field of Classification Search
CPC ....... G06F 1/3287; H02J 2207/40; H02J 7/00; H02J 7/0068; H02J 7/007
See application file for complete search history.

(56) References Cited

U.S. PATENT DOCUMENTS

| | | |
|---|---|---|
| 2005/0174710 A1 | 8/2005 | Masui et al. |
| 2009/0077393 A1 | 3/2009 | Nakamura |
| 2009/0111532 A1 | 4/2009 | Salokannel |
| 2012/0104853 A1 | 5/2012 | Yasuda |
| 2014/0112036 A1 | 4/2014 | Chen |
| 2014/0198337 A1 | 7/2014 | Nakajima |
| 2015/0293514 A1 | 10/2015 | Tupala |
| 2016/0020619 A1 | 1/2016 | Ma et al. |
| 2016/0188514 A1* | 6/2016 | Forghani-Zadeh ... G06F 1/3253 710/313 |
| 2017/0163055 A1 | 6/2017 | Ko et al. |
| 2017/0293335 A1* | 10/2017 | Dunstan .............. G06F 13/4282 |
| 2017/0364114 A1 | 12/2017 | Sporck et al. |
| 2018/0060201 A1* | 3/2018 | Newberry ................. G06F 1/30 |
| 2018/0129260 A1* | 5/2018 | Tseng ................... G06F 1/3253 |
| 2018/0267586 A1* | 9/2018 | Jung ..................... H02J 7/0069 |

OTHER PUBLICATIONS

The above patent document was cited in a European Search Report dated Jun. 4, 2019, which is enclosed, that issued in the corresponding European Patent Application No. 18214342.0.

\* cited by examiner

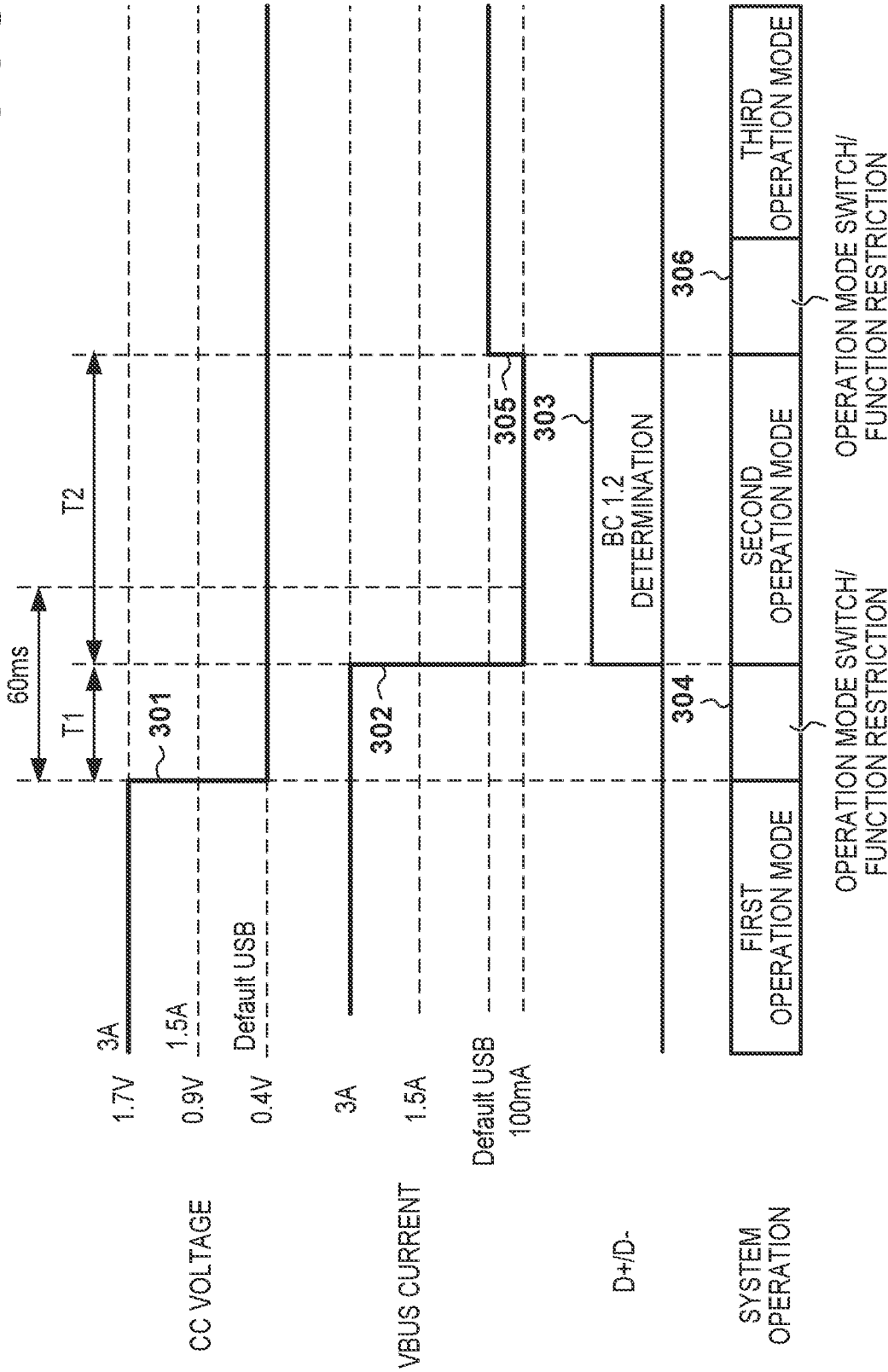

FIG. 4

| POWER SUPPLY CAPABILITY | CC VOLTAGE vRd |
|---|---|
| Default USB | $0.25V \leqq vRd < 0.66V$ |
| 1.5A, 5V | $0.66V \leqq vRd < 1.23V$ |
| 3A, 5V | $1.23V \leqq vRd \leqq 2.04V$ |

ELECTRONIC DEVICE THAT RECEIVES POWER FROM POWER SUPPLY APPARATUS AND METHOD THEREOF

BACKGROUND

Field of the Invention

Aspects of the disclosure generally relate to an electronic device that receives power from a power supply apparatus, and a method thereof.

Description of the Related Art

According to USB (Universal Serial Bus) standard (USB 3.0 standard, USB 2.0 standard, USB BC (Battery Charging) 1.2 standard, or the like) defined before USB Type-C standard, the power supply capability of a power supply apparatus is detectable by using D+ and D− terminals. In this specification, USB standard (USB 3.0 standard, USB 2.0 standard, USB BC (Battery Charging) 1.2 standard, or the like) which was defined before the USB Type-C standard will be referred to as a "legacy standard". In a legacy standard, the power supply capability of a power supply apparatus is determined by using D+ and D− terminals. In the USB Type-C standard, the power supply capability of a power supply apparatus is determined by using a CC (Configuration Channel) terminal. According to the USB Type-C standard, a CC voltage (a voltage applied to the CC terminal) indicates which of the three different power supply capabilities (Default USB, 7.5 W (1.5 A, 5 V), and 15 W (3 A, 5V)) is being employed as the power supply capability of the power supply apparatus. Default USB is a power supply capability defined by a legacy standard. 7.5 W (1.5 A, 5 V) and 15 W (3 A, 5V) are power supply capabilities defined by the USB Type-C standard. Hence, a power receiving apparatus can detect the power supplying capability of a power supply apparatus by the detected CC voltage. If the power supply capability of the power supply apparatus shifts from 15 W (3 A, 5V) or 7.5 W (1.5 A, 5 V) to Default USB, the power receiving apparatus is required to operate as a power receiving apparatus conforming to a legacy standard during a predetermined time defined by the USB Type-C standard.

Japanese Patent Laid-Open No. 2003-280771 discloses a method of controlling the operation of an electronic device in accordance with the power supply capability of a power supply apparatus. In Japanese Patent Laid-Open No. 2003-280771, switching of input power supply is performed so as not to exceed the power supply capability of the power supply apparatus.

A certain amount of time is required for the determination of the power supply capability of a power supply apparatus which is performed in accordance with a legacy standard. Hence, there is a possibility that the power supply from the power supply apparatus to the power receiving apparatus will be suppressed before the completion of the determination of the power supply capability of a power supply apparatus which is performed in accordance with a legacy standard. If power supplied from the power supply apparatus to the power receiving apparatus falls below the power consumption of the power receiving apparatus, the power receiving apparatus may unexpectedly stop its operation.

SUMMARY

According to an aspect of the embodiments, one or more of the problems described above that occur in an electronic device that operates as a power receiving apparatus can be solved.

According to an aspect of the embodiments, there is provided an electronic device comprising: a connector that comprises a first terminal for receiving power from a power supply apparatus, a second terminal, a third terminal, and a fourth terminal; a receiving power control unit that controls power received from the power supply apparatus via the first terminal; a determination unit that determines a power supply capability of the power supply apparatus by using the second terminal or the third terminal and the fourth terminal; and a control unit that restricts, before the power supply capability of the power supply apparatus is determined by using the third terminal and the fourth terminal, power to be received from the power supply apparatus via the first terminal when a predetermined transition occurs in the second terminal.

According to an aspect of the embodiments, there is provided a method comprising: starting to receive power from a power supply apparatus via a first terminal for receiving power from the power supply apparatus; determining a power supply capability of the power supply apparatus by using a second terminal; restricting power to be received from the power supply apparatus via the first terminal when a predetermined transition occurs in the second terminal; and determining, after restricting power to be received from the power supply apparatus via the first terminal, the power supply capability of the power supply apparatus by using a third terminal and a fourth terminal.

According to an aspect of the embodiments, there is provided a non-transitory storage medium that stores a program causing a computer to execute a method, the method comprising: starting to receive power from a power supply apparatus via a first terminal for receiving power from the power supply apparatus; determining a power supply capability of the power supply apparatus by using a second terminal; restricting power to be received from the power supply apparatus via the first terminal when a predetermined transition occurs in the second terminal; and determining, after restricting power to be received from the power supply apparatus via the first terminal, the power supply capability of the power supply apparatus by using a third terminal and a fourth terminal.

Further aspects of the embodiments will become apparent from the following embodiments.

BRIEF DESCRIPTION OF THE DRAWINGS

FIG. 3 is a timing chart for illustrating an example of the operation of the power receiving apparatus 100;

FIG. 4 is a table for illustrating the relationship between a CC voltage and power supplying capabilities of a power supply apparatus 200.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
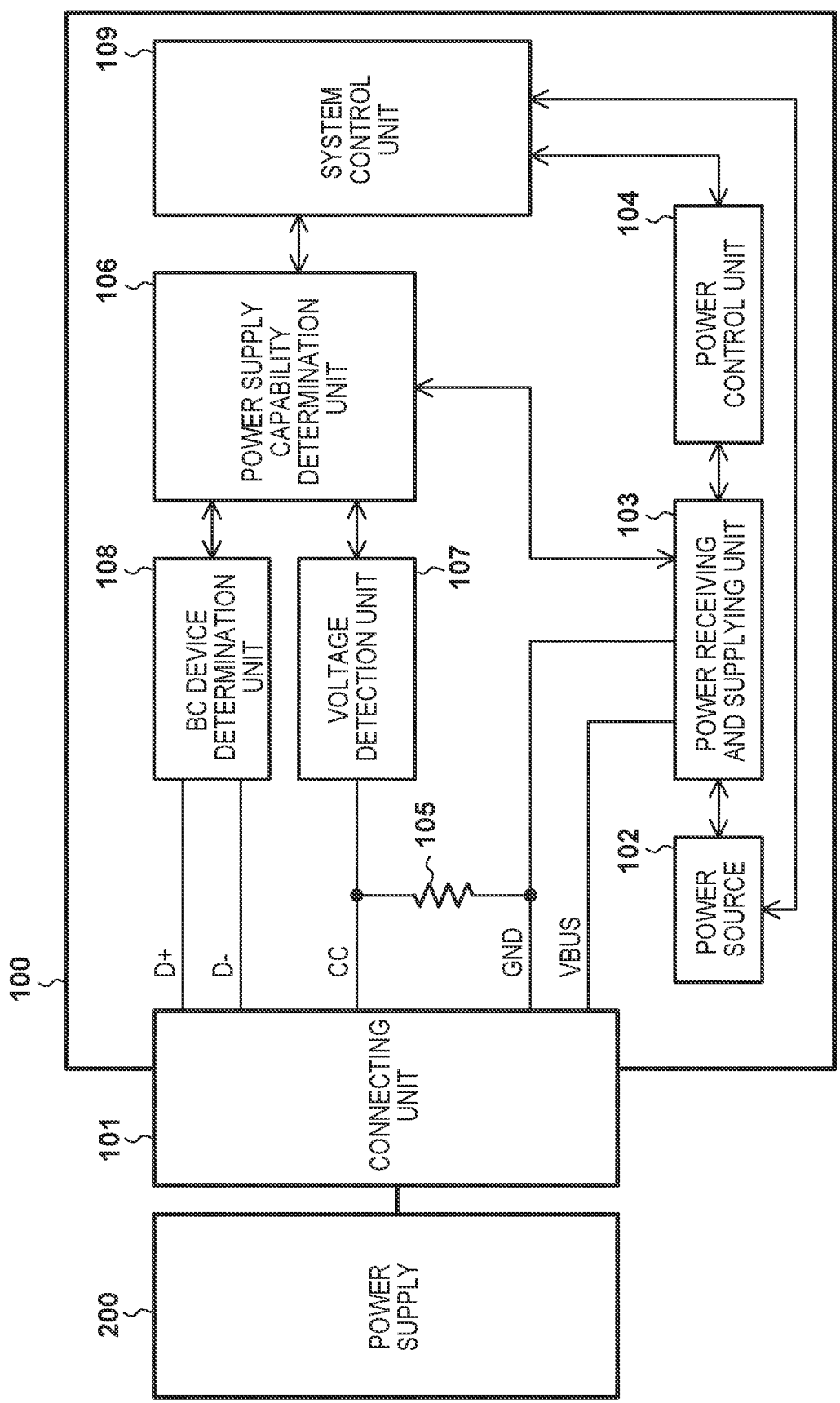
FIG. 1 is a block diagram for illustrating an example of components of a power receiving apparatus 100 according to the first embodiment.

FIG. 1 is a block diagram for illustrating an example of components of a power receiving apparatus 100 according to the first embodiment.

The power receiving apparatus 100 is an electronic device that receives power supplied from a power supply apparatus 200 to which it is connected via a USB Type-C cable. Although a case in which the power supply apparatus 200 is an AC adapter (or an AC-USB adapter) that converts AC power into DC power will be exemplified in the first embodiment, the power supply apparatus 200 is not limited to the AC adapter. For example, the power supply apparatus 200 may be a portable battery or the like. Also, although a case in which the power receiving apparatus 100 is an electronic device that operates as an image capturing apparatus (for example, a digital camera) will be exemplified in the first embodiment, the power receiving apparatus 100 is not limited to an image capturing apparatus.

As shown in FIG. 1, the power receiving apparatus 100 includes a connecting unit 101, a power source 102, a power receiving and supplying unit 103, a power control unit 104, a resistor 105, a power supply capability determination unit 106, a voltage detection unit 107, a BC device determination unit 108, and a system control unit 109. However, components of the power receiving apparatus 100 are not limited to those shown in FIG. 1.

Figure 5:
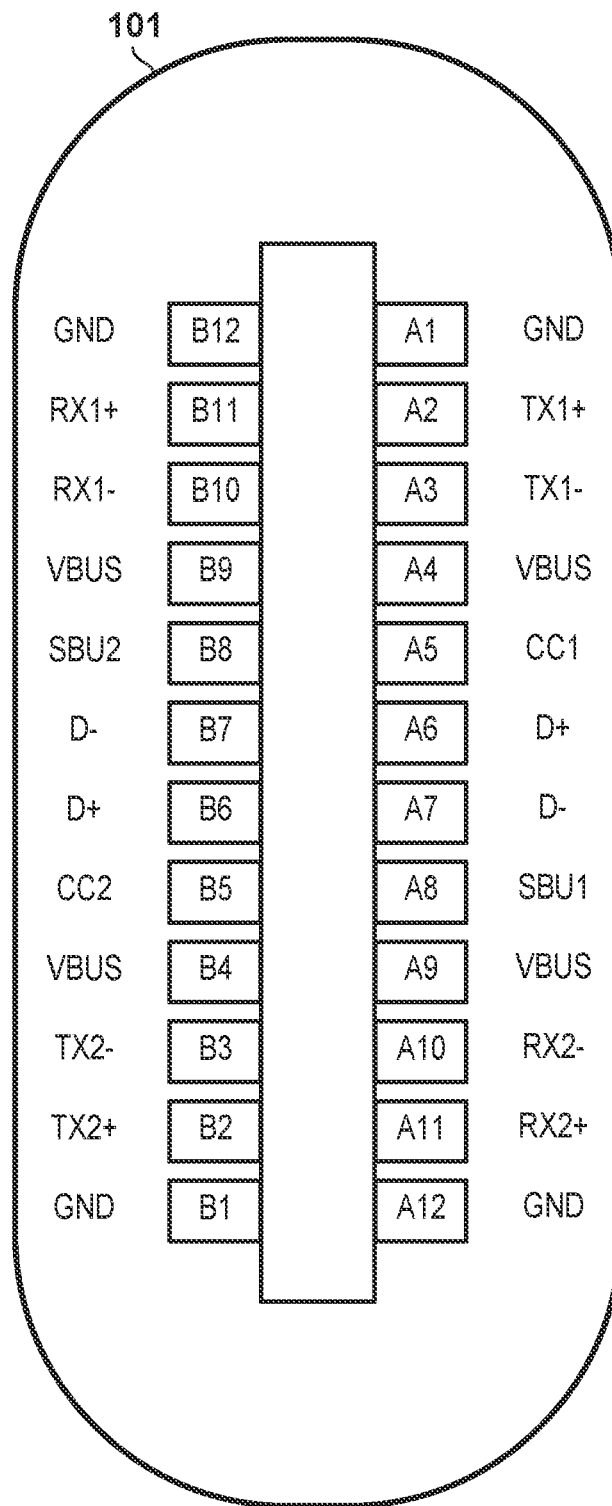
FIG. 5 is a view for illustrating the pin assignment of a connecting unit 101.

The connecting unit 101 is a connector (receptacle) conforming to the USB Type-C standard. The power supply apparatus 200 is connected to the connecting unit 101 via a USB Type-C cable. The connecting unit 101 has a pin assignment as shown in FIG. 5. FIG. 5 is a view for illustrating the pin assignment of the connecting unit 101. The connecting unit 101 has a point-symmetric pin assignment. The connecting unit 101 includes at least a VBUS terminal, a GND (ground) terminal, a CC (configuration channel) terminal, a D+ terminal, and a D− terminal. The power supply from the power supply apparatus 200 to the power receiving apparatus 100 is performed via the VBUS terminal. A voltage indicating the power supply capability of the power supply apparatus 200 is applied to the CC terminal. Communication conforming to the USB 2.0 standard is performed via the D+ terminal and the D− terminal. In a case in which the power supply apparatus 200 is an electronic device conforming to a legacy standard, the type of power supply apparatus 200 is determined via the D+ terminal and the D− terminal. The GND (ground) terminal is connected to a ground line.

The power source 102 is a chargeable battery (for example, a lithium ion battery). The power receiving and supplying unit 103 supplies power received from the power supply apparatus 200 via the VBUS terminal to the power control unit 104 and the power source 102. The power receiving and supplying unit 103 can charge the power source 102 with power received from the power supply apparatus 200 via the VBUS terminal. The power receiving and supplying unit 103 controls the charging of the power source 102. The power receiving and supplying unit 103 can also control power to be received (corresponding to power to be received by the power receiving and supplying unit 103 from the power supply apparatus 200 via the VBUS terminal of the connecting unit 101) so that power to be received will not exceed the power supply capability of the power supply apparatus 200 which has been determined by the power supply capability determination unit 106. In this manner, the power receiving and supplying unit 103 can function as a control unit that controls power to be received from the power supply apparatus 200 via the VBUS terminal. The power control unit 104 can supply power received from the power receiving and supplying unit 103 to components of the power receiving apparatus 100.

The resistor 105 is a pull-down resistor for lowering the voltage of the CC terminal of the connecting unit 101 to a predetermined voltage level. The predetermined voltage is a voltage defined by the USB Type-C standard. One end of the resistor 105 is connected to the CC terminal of the connecting unit 101. The other end of the resistor 105 is connected to the GND terminal of the connecting unit 101. The resistor 105 has a predetermined resistance value defined by the USB Type-C standard.

The voltage detection unit 107 is connected to the CC terminal of the connecting unit 101. The voltage detection unit 107 detects a CC voltage (corresponding to a voltage applied to the CC terminal of the connecting unit 101) and notifies the power supply capability determination unit 106 of information indicating the CC voltage. The BC device determination unit 108 is connected to the D+ terminal and the D− terminal. The BC device determination unit 108 determines the type of the power supply apparatus 200 via the D+ terminal and the D− terminal, and notifies the power supply capability determination unit 106 of information related to the determined type. Note that the BC device determination unit 108 determines the type of the power supply apparatus 200 in compliance with the USB BC 1.2 standard.

The power supply capability determination unit 106 determines the power supply capability of the power supply apparatus 200 based on the CC voltage detected by the voltage detection unit 107. FIG. 4 shows the relationship between CC voltage and the power supply capability of the power supply apparatus 200. In a case in which the CC voltage is equal to or higher than 0.25 V but lower than 0.66 V, the power supply capability of the power supply apparatus 200 is Default USB. In a case in which the CC voltage is equal to or higher than 0.66 V but is lower than 1.23 V, the power supply capability of the power supply apparatus 200 is 7.5 W (1.5 A, 5 V). In a case in which the CC voltage is equal to or higher than 1.23 V but equal to or lower than 2.04 V, the power supply capability of the power supply apparatus 200 is 15 W (3 A, 5 V). For example, in a case in which the CC voltage is 0.9 V, the power supply capability determination unit 106 will determine that the power supply capability of the power supply apparatus 200 is 7.5 W (1.5 A, 5 V) because the CC voltage is equal to or higher than 0.66 V but lower than 1.23 V. The power supply capability determination unit 106 can also acquire information related to the type of power supply apparatus 200 from the BC device determination unit 108, and can determine the power supply capability of the power supply apparatus 200 based on the information related to the type of the power supply apparatus 200. In addition, the power supply capability determination unit 106 can notify the power receiving and supplying unit 103 and the system control unit 109 of the information related to the determined power supply capability of the power supply apparatus 200.

The system control unit 109 includes a memory that stores programs for controlling the components of the power receiving apparatus 100 and a processor for controlling the components of the power receiving apparatus 100 by executing corresponding programs stored in the memory. The processor of the system control unit 109 is, for example, a hardware processor. The system control unit 109 can detect power supplied to each component by the power control unit 104. The system control unit 109 can also calculate the amount of power supplied to each component by the power control unit 104 based on the operation state of the power receiving apparatus 100. The system control unit 109 can also detect the remaining battery amount of the power source 102. The system control unit 109 determines the operation mode of the power receiving apparatus 100 based on the remaining battery amount. The system control unit 109 can control the operation of the power receiving apparatus 100 so that power supplied from the power control unit 104 to each component will be equal to or lower than the power supply capability of the power supply apparatus 200 determined by the power supply capability determination unit 106. For example, in a case in which the power supply apparatus 200 is connected to the connecting unit 101 via a USB Type-C cable, the system control unit 109 can control the power receiving apparatus 100 so that the power receiving apparatus 100 will operate by using power received from the power supply apparatus 200 via the VBUS terminal.

Figure 2A:
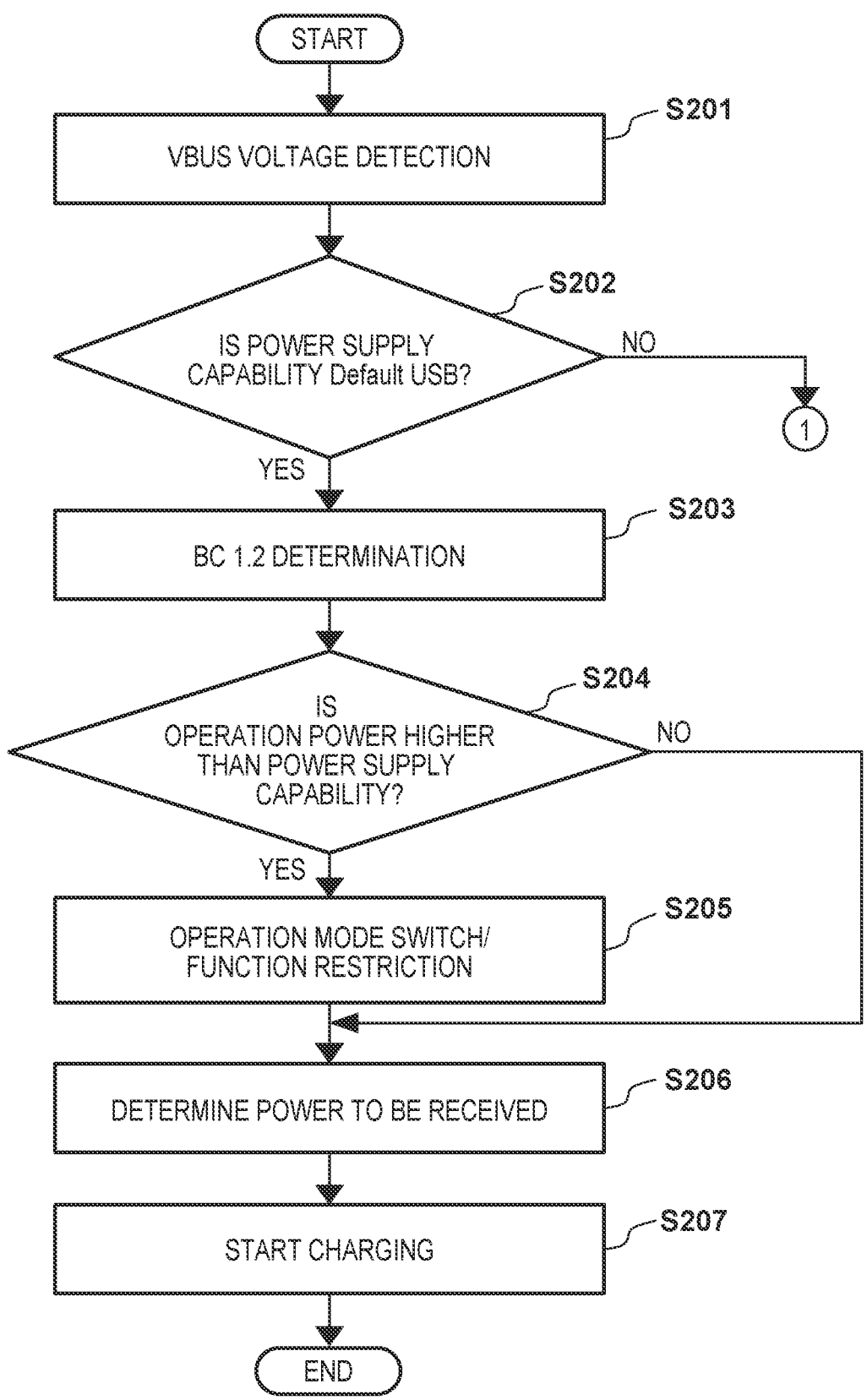
FIGS. 2A and 2B are flowcharts for illustrating an example of the operation of the power receiving apparatus 100.
Figure 2B:
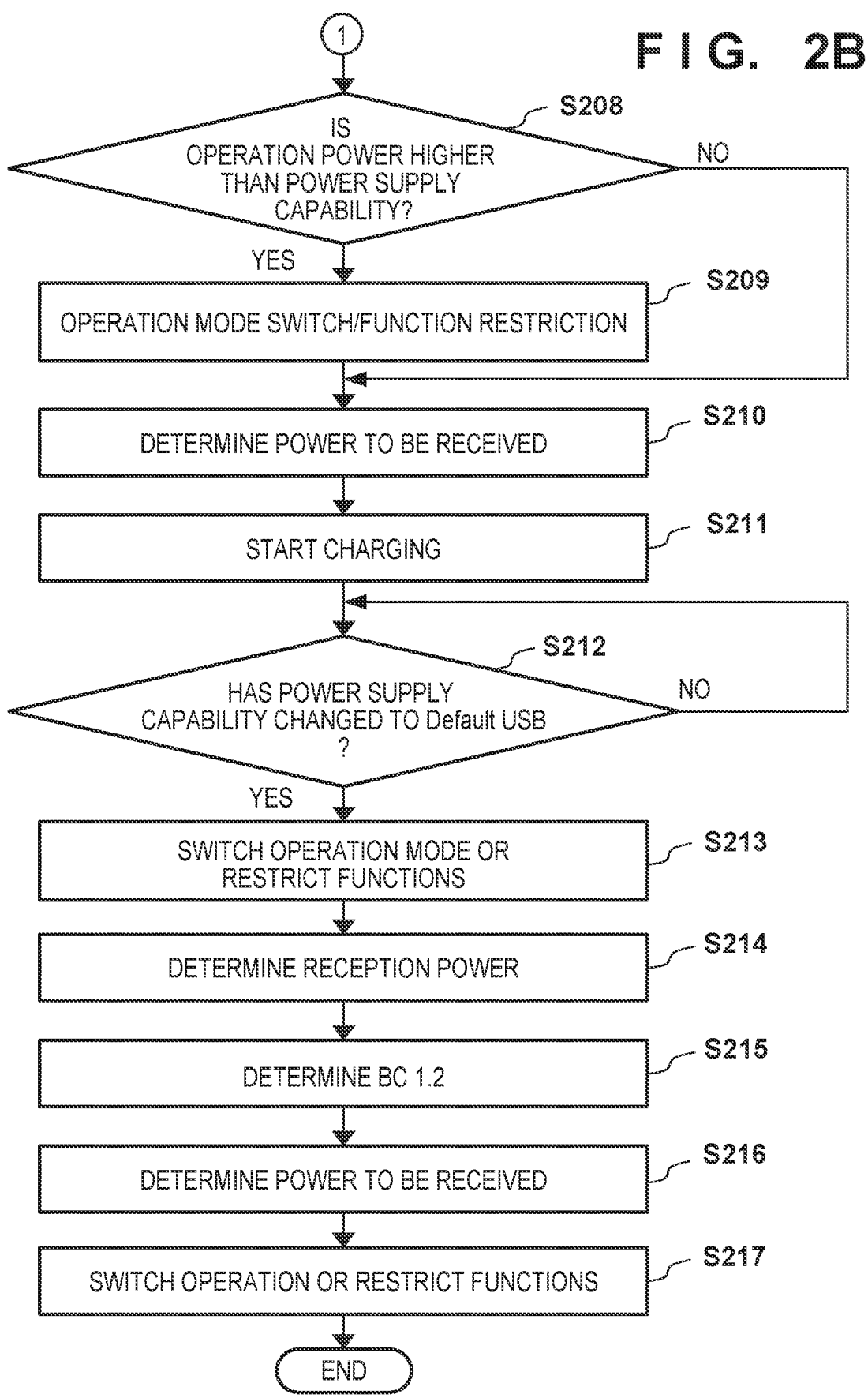

FIGS. 2A and 2B are flowcharts for illustrating an example of the operation of the power receiving apparatus 100 according to the first embodiment.

Step S201 is started when the power supply apparatus 200 is connected to the connecting unit 101 via a USB Type-C cable. In step S201, the power receiving and supplying unit 103 detects the voltage applied to the VBUS terminal of the connecting unit 101. Subsequently, the process of step S202 is started.

In step S202, the power supply capability determination unit 106 determines whether the power supply capability of the power supply apparatus 200 is Default USB. Whether the power supply capability of the power supply apparatus 200 is Default USB is determined based on the CC voltage detected by the voltage detection unit 107. If the CC voltage is equal to or higher than 0.25 V but lower than 0.66 V, the power supply capability determination unit 106 determines that the power supply capability of the power supply apparatus 200 is Default USB. In a case in which the power supply capability of the power supply apparatus 200 is Default USB, it is defined by the USB Type-C standard that the power receiving apparatus 100 will receive power complying with the legacy standard via the VBUS terminal. Hence, if the power supply capability of the power supply apparatus 200 is Default USB (YES in step S202), the process of step S203 is started. If the power supply capability of the power supply apparatus 200 is not Default USB, the power supply capability determination unit 106 will determine the power supply capability of the power supply apparatus 200 based on the CC voltage. After the power supply capability of the power supply apparatus 200 is determined based on the CC voltage (NO in step S202), the process of step S208 is started.

In step S203, the BC device determination unit 108 determines the type of the power supply apparatus 200 via the D+ terminal and the D− terminal. The BC device determination unit 108 supplies, to the power supply capability determination unit 106, the information related to the type of the power supply apparatus 200. The power supply capability determination unit 106 determines the power supply capability of the power supply apparatus 200 based on the information related to the type of the power supply apparatus 200. Subsequently, the process of step S204 is started.

In step S204, the system control unit 109 determines whether the operation power (corresponding to power supplied to each component from the power control unit 104 to operate the power receiving apparatus 100) is higher than the power supply capability of the power supply apparatus 200 determined in step S203. If it is determined that the operation power is higher than the power supply capability of the power supply apparatus 200 (YES in step S204), the process of step S205 is started. If it is determined that the operation power is equal to or lower than the power supply capability of the power supply apparatus 200 (NO in step S204), the process of step S206 is started.

In step S205, the system control unit 109 switches the operation mode or restricts the functions of the power receiving apparatus 100 so that operation power (corresponding to power supplied to each component from the power control unit 104 to operate the power receiving apparatus 100) will be equal to or lower than the power supply capability of the power supply apparatus 200 determined in step S203. Switching from an image capturing mode (an operation mode of obtaining an image by an image capturing unit (not shown)) to a reproduction mode (an operation mode of displaying an image reproduced from a storage medium on a display unit (not shown)) is an example of operation mode switching. Power supplied from the power control unit 104 to each component of the power receiving apparatus 100 in the reproduction mode is lower than power supplied from the power control unit 104 to each component of the power receiving apparatus 100 in the image capturing mode. A state in which some or all of the image capturing functions do not operate is an example of function restriction. Subsequently, the process of step S206 is started.

In step S206, the power receiving and supplying unit 103 determines power to be received (corresponding to power to be received from the power supply apparatus 200 by the power receiving and supplying unit 103 via the VBUS terminal of the connecting unit 101) so that power to be received will not exceed the power supply capability of the power supply apparatus 200 determined in step S203. The power receiving and supplying unit 103 starts the power receiving operation so as to receive, from the power supply apparatus 200, power equal to or lower than the power determined in step S206. Subsequently, the process of step S207 is started.

In step S207, the power receiving and supplying unit 103 starts the charging of the power source 102 together with the supplying of power received from the power supply apparatus 200 via the VBUS terminal of the connecting unit 101 to the power control unit 104 and the power source 102.

As described above, if the power supply capability of the power supply apparatus 200 is not Default USB (NO in step S202), the process of step S208 is started. In step S208, the system control unit 109 determines whether the operation power (corresponding to power supplied from the power control unit 104 to each component to operate the power receiving apparatus 100) is higher than the power supply capability of the power supply apparatus 200 determined in step S202. If it is determined that the operation power is higher than the power supply capability of the power supply apparatus 200 (YES in step S208), the process of step S209 is started. If the operation power is determined to be equal to or lower than the power supply capability of the power supply apparatus 200 (NO in step S208), the process of step S210 is started.

In step S209, the system control unit 109 switches the operation mode or restricts the functions of the power receiving apparatus 100 so that the operation power (corresponding to power supplied from the power control unit 104 to each component to operate the power receiving apparatus 100) will be equal to or lower than the power supply capability of the power supply apparatus 200 determined in step S202. Switching from the image capturing mode to the reproduction mode is an example of operation mode switching. A state in which some or all of the image capturing functions do not operate is an example of function restriction. Subsequently, the process of step S210 is started.

In step S210, the power receiving and supplying unit 103 determines power to be received (corresponding to power to be received from the power supply apparatus 200 by the power receiving and supplying unit 103 via the VBUS terminal of the connecting unit 101) so that power to be received will not exceed the power supply capability of the power supply apparatus 200 determined in step S202. The power receiving and supplying unit 103 starts the power receiving operation so as to receive, from the power supply apparatus 200, power equal to or lower than the power determined in step S210. Subsequently, the process of step S211 is started.

In step S211, the power receiving and supplying unit 103 starts the charging of the power source 102 together with the supplying of power received from the power supply apparatus 200 via the VBUS terminal of the connecting unit 101 to the power control unit 104 and the power source 102. Subsequently, the process of step S212 is started.

In step S212, the power supply capability determination unit 106 determines whether the power supply capability of the power supply apparatus 200 has been changed to Default USB. Whether the power supply capability of the power supply apparatus 200 has been changed to Default USB is determined based on the CC voltage detected by the voltage detection unit 107. If the CC voltage is equal to or higher than 0.25 V but is lower than 0.66 V, the power supply capability determination unit 106 will determine that the power supply capability of the power supply apparatus 200 has been changed to Default USB. If the power supply capability of the power supply apparatus 200 has been changed to Default USB (YES in step S212), the process of step S213 is started. If the power supply capability of the power supply apparatus 200 has not been changed to Default USB (NO in step S212), the process of step S212 is repeated.

In step S213, the system control unit 109 switches the operation mode or restricts the functions of the power receiving apparatus 100 so that the operation power (corresponding to power supplied to each component from the power control unit 104 to operate the power receiving apparatus 100) will be equal to or lower than power (for example 0.5 W (100 mA, 5 V)) conforming to Default USB. Switching from the reproduction mode to a sleep mode is an example of operation mode switching. In the sleep mode, power to be supplied from the power control unit 104 to each component of the power receiving apparatus 100 is lower than power to be supplied from the power control unit 104 to each component of the power receiving apparatus 100 in the reproduction mode. A state in which some or all of the reproduction functions do not operate is an example of function restriction. Subsequently, the process of step S214 is started.

In step S214, the power receiving and supplying unit 103 determines power to be received so that power to be received will not exceed the power conforming to Default USB. The power receiving and supplying unit 103 starts the power receiving operation so as to receive, from the power supply apparatus 200, power equal to or lower than the power determined in step S214. Subsequently, the process of step S215 is started.

In step S215, the BC device determination unit 108 determines the type of the power supply apparatus 200 via the D+ terminal and the D− terminal. The BC device determination unit 108 supplies, to the power supply capability determination unit 106, the information related to the type of the power supply apparatus 200. The power supply capability determination unit 106 determines the power supply capability of the power supply apparatus 200 based on the information related to the type of the power supply apparatus 200. Subsequently the process of step S216 is started.

In step S216, the power receiving and supplying unit 103 determines power to be received (corresponding to power to be received from the power supply apparatus 200 by the power receiving and supplying unit 103 via the VBUS terminal of the connecting unit 101) so that power to be received will not exceed the power supply capability (for example, 2.5 W (500 mA, 5 V)) of the power supply apparatus 200 determined in step S215. If the power determined in step S216 is equal to or lower than the power conforming to Default USB, the reception power may be power higher than the power determined in step S213. By determining to set the power determined in step S216 to be power higher than the power determined in step S213, it becomes possible to reduce the time required until the power source 102 reaches a fully charged state. Subsequently, the process of step S217 is started.

In step S217, the system control unit 109 switches the operation mode or restricts the functions of the power receiving apparatus 100 so that the operation power (corresponding to power supplied to each component from the power control unit 104 to operate the power receiving apparatus 100) will be equal to or lower than the power determined in step S216. Switching from the sleep mode to the reproduction mode or the image capturing mode is an example of operation mode switching. A state in which some or all of the image capturing functions or the reproduction functions do not operate is an example of function restriction. Subsequently, the processing of the flowcharts shown in FIGS. 2A and 2B end.

Note that the first embodiment described an example in which the power receiving apparatus 100 operates by using power from the power supply apparatus 200 instead of using power from the power source 102, in a case in which the power supply apparatus 200 is connected to the power receiving apparatus via a USB Type-C cable. However, it may be set so that the power receiving apparatus 100 will operate by using both power from the power source 102 and power from the power supply apparatus 200, in a case in which the power supply apparatus 200 is connected to the power receiving apparatus via a USB Type-C cable. It may be set so that, for example, if there is a sufficient battery amount remaining in the power source 102, the processes of steps S205, S209, S213, and S217 need not be performed.

FIG. 3 is a timing chart for illustrating an example of the operation of the power receiving apparatus 100 according to the first embodiment. FIG. 3 shows a timing chart corresponding to the operation example of the power receiving apparatus 100 from step S212 to step S217.

A transition 301 corresponds to step S212. A transition 302 corresponds to step S214. A period T1 from the transition 301 to the transition 302 is defined to be 60 ms or less in accordance with the USB Type-C standard.

A process 303 corresponds to the process of step S215. A process 304 corresponds to the process of step S213. There is a possibility that a period T2 in which the process 303 is performed may exceed 60 ms if the process is performed in compliance with the USB BC 1.2 standard. For example, if it is set so that the process 303 and the process 304 will be performed after the transition 301 but before the transition 302, the period T1 may exceed 60 ms and deviate from the USB Type-C standard. Hence, in the first embodiment, it is set so that the process 303 will be performed after the transition 302.

A transition 305 corresponds to step S216. A process 306 corresponds to the process of step S217. The transition 305 occurs after the process 303, and the process 306 is performed subsequently.

As described above, in a case in which the power supply capability of the power supply apparatus 200 is determined in compliance with the USB BC2.1 standard, it may require a time that exceeds 60 ms. Hence, the following state may occur if the power supply capability of the power supply apparatus 200 is determined in compliance with the USB BC 1.2 standard after the power supply capability of the power supply apparatus 200 has been determined to be Default USB based on the CC voltage. Power which is to be supplied from the power supply apparatus 200 to the power receiving apparatus 100 via the VBUS terminal of the connecting unit 101 may shift to a voltage conforming to Default USB before the process of determining the power supply capability of the power supply apparatus 200 in compliance with the USB BC 1.2 standard is completed. In this case, power supplied from the power supply apparatus 200 to the power receiving apparatus 100 via the VBUS terminal will fall below the power that the power receiving apparatus 100 will attempt to receive from the power supply apparatus 200 via the VBUS terminal. If power supplied from the power supply apparatus 200 to the power receiving apparatus 100 via the VBUS terminal falls below the power that the power receiving apparatus 100 will attempt to receive from the power supply apparatus 200 via the VBUS terminal, the operation of the power receiving apparatus 100 may stop unexpectedly. In contrast, in the first embodiment, in a case in which it is determined that the power supply capability of the power supply apparatus 200 is Default USB based on the CC voltage, the following process is performed before the power supply capability of the power supply apparatus 200 is determined in compliance with the USB BC 1.2 standard. Operation mode switching or function restriction is performed in the power receiving apparatus 100 so that power to be received will be equal to or lower than the power (for example 0.5 W (100 mA, 5 V)) conforming to Default USB. Hence, according to the first embodiment, it is possible to prevent the power supplied from the power supply apparatus 200 to the power receiving apparatus 100 via the VBUS terminal from falling below the power that the power receiving apparatus 100 will attempt to receive from the power supply apparatus 200 via the VBUS terminal. Therefore, according to the first embodiment, it is possible to reduce the occurrence of a state in which the operation of the power receiving apparatus 100 stops unexpectedly.

Note that the embodiments of the disclosure are not limited to the first embodiment as described above. The embodiments of the disclosure include the first embodiment that has been changed or modified without departing from the scope of the disclosure.

Second Embodiment

Various kinds of functions, processes, or methods described in the first embodiment can be implemented by a personal computer, a microcomputer, a CPU (Central Processing Unit), a processor, or the like by using corresponding programs. In the second embodiment, a personal computer, a microcomputer, a CPU (Central Processing Unit), a processor, or the like will be referred to as a "computer X" hereinafter. Also, in the second embodiment, a program for controlling the computer X, that is, a program for implementing one of the various kinds of functions, processes, or methods described in the first embodiment will be referred to as a "program Y".

Each of the various kinds of functions, processes, or methods described in the first embodiment is implemented by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory, a nonvolatile memory, or the like. The computer-readable storage medium according to the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2017-254852, filed Dec. 28, 2017, which is hereby incorporated by reference herein in its entirety.

What is claimed is:

1. An electronic device comprising:
a connector that includes a VBUS terminal for receiving power from a power supply apparatus, a CC (configuration channel) terminal, and data communication terminals;
a determination circuitry that determines a power supply capability of the power supply apparatus by using the data communication terminals, after a predetermined transition occurs in the CC terminal in response that the power supply capability of the power supply apparatus is changed to a predetermined power supply capability; and
a receiving power control circuitry that restricts power to be received from the power supply apparatus via the VBUS terminal after the predetermined transition occurs in the CC terminal and before the power supply capability of the power supply apparatus is determined by using the data communication terminals.

2. The electronic device according to claim 1, wherein the predetermined power supply capability conforms to USB (Universal Serial Bus) Battery Charging standard.

3. The electronic device according to claim 1, wherein a voltage of the CC terminal before the occurrence of the predetermined transition is a voltage defined in USB Type-C standard.

4. The electronic device according to claim 1, wherein the determination circuitry determines the power supply capability of the power supply apparatus based on a type of the power supply apparatus which is determined via the data communication terminals.

5. The electronic device according to claim 1, wherein the receiving power control circuitry controls power to be received from the power supply apparatus in accordance with the power supply capability of the power supply apparatus determined by using the data communication terminals.

6. The electronic device according to claim 1, wherein after the power supply capability of the power supply apparatus is determined by using the data communication terminals, the receiving power control circuitry controls power to be received from the power supply apparatus in accordance with the power supply capability of the power supply apparatus determined by using the data communication terminals.

7. The electronic device according to claim 1, wherein the control circuitry determines an operation mode based on a remaining battery amount.

8. A method comprising:

receiving power from a power supply apparatus via a VBUS terminal;

determining a power supply capability of the power supply apparatus by using data communication terminals, after a predetermined transition occurs in a CC (configuration channel) terminal in response that the power supply capability of the power supply apparatus is changed to a predetermined power supply capability; and restricting power to be received from the power supply apparatus via the VBUS terminal after the predetermined transition occurs in the CC terminal and before the power supply capability of the power supply apparatus is determined by using the data communication terminals.

9. A non-transitory storage medium that stores a program causing a computer to execute a method, the method comprising:

receiving power from a power supply apparatus via a VBUS terminal;

determining a power supply capability of the power supply apparatus by using data communication terminals, after a predetermined transition occurs in a CC configuration channel) terminal in response that the power supply capability of the power supply apparatus is changed to a predetermined power supply capability; and restricting power to be received from the power supply apparatus via the VBUS terminal after the predetermined transition occurs in the CC terminal and before the power supply capability of the power supply apparatus is determined by using the data communication terminals.

* * * * *